(12) United States Patent
Lee

(10) Patent No.: US 8,826,055 B2
(45) Date of Patent: *Sep. 2, 2014

(54) COMPUTER SYSTEM AND CONTROL METHOD THEREOF

(71) Applicant: Samsung Electronics Co. Ltd., Suwon-si (KR)

(72) Inventor: Cheol-ho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/728,576

(22) Filed: Dec. 27, 2012

(65) Prior Publication Data

US 2013/0124887 A1 May 16, 2013

Related U.S. Application Data

(63) Continuation of application No. 11/755,294, filed on May 30, 2007, now Pat. No. 8,365,000.

(30) Foreign Application Priority Data

Oct. 30, 2006 (KR) .......................... 10-2006-0105900

(51) Int. Cl.
*G06F 1/32* (2006.01)
*G06F 1/00* (2006.01)

(52) U.S. Cl.
CPC ............ *G06F 1/3275* (2013.01); *G06F 1/3206* (2013.01)
USPC .......................................... 713/324; 713/320

(58) Field of Classification Search
CPC ........ G06F 1/32; G06F 1/3206; G06F 1/3275

USPC .......................................... 713/323, 324, 320
See application file for complete search history.

(56) References Cited

U.S. PATENT DOCUMENTS

| | | | |
|---|---|---|---|
| 6,219,796 B1 | 4/2001 | Bartley | |
| 6,385,113 B1 | 5/2002 | Longwell et al. | |
| 6,665,806 B1 | 12/2003 | Shimizu | |
| 6,766,420 B2 | 7/2004 | Rawson, III | |
| 6,853,603 B1 | 2/2005 | White et al. | |
| 6,963,987 B1 | 11/2005 | Emons | |
| 7,093,149 B2 | 8/2006 | Tsirkel | |
| 7,100,013 B1 | 8/2006 | Waal | |
| 7,237,133 B2 | 6/2007 | Aoki | |
| 8,365,000 B2 * | 1/2013 | Lee | 713/324 |
| 2003/0159024 A1 | 8/2003 | Chen | |
| 2004/0250148 A1 | 12/2004 | Tsirkel et al. | |
| 2008/0005516 A1 | 1/2008 | Meinschein et al. | |

FOREIGN PATENT DOCUMENTS

| | | |
|---|---|---|
| JP | 2005-025364 A | 1/2005 |
| JP | 2005-115906 A | 4/2005 |
| JP | 2006-236532 A | 9/2006 |

OTHER PUBLICATIONS

Office Action issued by the State Intellectual Property Office of the People's Republic of China on Mar. 13, 2009.

* cited by examiner

*Primary Examiner* — Chun Cao
(74) *Attorney, Agent, or Firm* — Jefferson IP Law, LLP

(57) ABSTRACT

A computer system includes memory units; a power supply to supply power to the memory units; and a controller to control the supply of power to the plurality of memory units so as to intercept power supplied from the power supply to at least one of the memory units, among the plurality of memory units according to user input.

23 Claims, 7 Drawing Sheets

COMPUTER SYSTEM AND CONTROL METHOD THEREOF

CROSS-REFERENCE TO RELATED APPLICATIONS

This application is a continuation of application Ser. No. 11/755,294, filed on May 30, 2007, which claimed the benefit under 35 U.S.C §119(a) of a Korean patent application filed on Oct. 30, 2006 in the Korean Intellectual Property Office and assigned Serial No. 10-2006-0105900, the entire disclosure of each of which are hereby incorporated by reference.

BACKGROUND OF THE INVENTION

1. Field of the Invention

Aspects of the present invention relate to a computer system and a control method thereof and, more particularly, to a computer system having a dual-channel memory structure and a control method thereof.

2. Description of the Related Art

As shown in FIG. 1, a conventional computer system 10 includes a central processing unit (CPU) 11, a memory unit 12, a graphic processing unit 14, a North bridge 13, a display unit 15, a South bridge 16, and a peripheral device 17. The CPU 11 executes programs and performs various operations. The memory unit 12 stores the programs executed by the CPU 11 and the data processed by the CPU 11. The graphic processing unit 14 performs graphic processing operations. The display unit 15 displays images based on the data processed by the graphic processing unit 15. The North bridge 13 is a memory controller and reads/writes data from/to the memory unit 12. The South bridge 16 controls input/output of the peripheral device 17 and acts as an interface between the CPU 11 and the peripheral device 17. The memory unit 12 can be a random access memory (RAM). The graphic processing unit 14 can be a graphic card. The display unit 15 can be a monitor. The peripheral device 17 may include a hard disk drive (HDD), a read only memory (ROM), a network card, and/or a sound card.

Reducing power consumption has been a main issue in designing computer systems like the computer system 10. Since the CPU 11 consumes a lot of power, power consumption of the CPU 11 needs to be reduced in order to reduce overall power consumption of the computer system 10. Various techniques, such as reducing voltage or clock speed, have been used to reduce power consumption of the CPU 11. Techniques of reducing power consumption have been applied to a portable computer system (e.g., a notebook computer).

Power consumption of the display unit 15 can be reduced by adjusting the brightness of the screen in a low power mode. The South bridge 16 consumes little power compared to overall elements of the computer system 10 and virtually no power when the South bridge is inactive.

However, the memory unit 12 consumes a lot of power when reading/writing data since data flow most frequently occurs in the memory unit 12 in the computer system 10. In addition, the memory unit 12 performs a self-refresh operation to maintain information stored in the memory unit 12. The memory unit 12 thus consumes a considerable amount of power even when not reading/writing data.

Conventional computer systems like the computer system 10 commonly use a dual-channel memory bus (referred to as a "dual-channel memory" or a "dual-channel") to improve memory performance. The memory unit 12 includes a first memory unit 12a and a second memory unit 12b. Two mutually independent 64-bit memory channels are provided in parallel in the dual-channel memory bus such that a 128-bit data bus can be realized. The two 64-bit memory channels are respectively referred to as the first memory unit 12a and the second memory unit 12b. The dual-channel memory bus improves system performance by about 20% to 30% compared to a single channel memory bus.

FIG. 2 is a block diagram of a power supplying configuration of a dual-channel structure of the conventional computer system 10. The computer system 10 further includes a memory power supply 19a to supply power to the first memory unit 12a and the second memory unit 12b. The computer system 10 further includes a first termination unit 18a and a second termination unit 18b to improve signal quality and a termination power supply 19b to supply power to the first and second termination unit 18a and 18b.

However, in the conventional computer system 10, power is supplied in parallel to the first and second memory units 12a and 12b from the memory power supply 19a. Since the memory unit 12 is periodically refreshed even though only one of the first and second memory units 12a and 12b is used, the other memory not in use unnecessarily consumes power.

SUMMARY OF THE INVENTION

Aspects of the present invention provide a computer system employing a dual-channel memory structure to minimize power consumption and a control method thereof.

According to an aspect of the invention, a computer system is provided comprising a plurality of memory units; a power supply to supply power to the plurality of memory units; and a controller to control the supply of power to the plurality of memory units so as to intercept power supplied from the power supply to at least one of the plurality of memory units, according to a user's selection.

According to another aspect of the invention, the plurality of memory units comprises a first memory unit and a second memory unit.

According to another aspect of the invention, when the user selects the low-power mode, the controller intercepts the supply of power to at least one memory unit of the plurality of memory units that corresponds to a low-power mode.

According to another aspect of the invention, the computer system further comprises a setting storage unit, wherein the controller stores user setting information on the selection of the low-power mode in the setting storage unit and determines whether the low-power mode is selected in accordance with the setting information stored in the setting storage unit when the computer system is booted.

According to another aspect of the invention, the computer system further comprises a user interface generator (UI) to generate a UI; and a display unit to display the UI generated by the UI generator; wherein the controller controls the UI generator to display a selection status of the low-power mode on the display unit.

According to another aspect of the invention, the computer system further comprises a user input unit having at least one button to select the low-power mode, wherein the controller determines whether the low-power mode is selected based on a press of the button.

According to another aspect of the invention, the controller backs up data stored in the at least one memory unit before intercepting the supply of power to the at least one memory unit.

According to another aspect of the invention, the computer system further comprises a plurality of termination units corresponding to the plurality of memory units to receive power from the power supply and to perform impedance matching during data transmission; wherein the controller intercepts power supplied from the power supply to at least one termination unit corresponding to the at least one memory unit.

According to another aspect of the present invention, a method is provided to control a computer system having a plurality of memory units and a power supply to supply power to the plurality of memory units, the method comprising: receiving a user input relating to the plurality of memory units; and intercepting a supply of power to at least one of the plurality of memory units according to the user input.

According to another aspect of the invention, the receiving of the user's selection further comprises receiving the user's selection on a power mode; and the intercepting of the supply of power comprises intercepting the supply of power to the corresponding memory unit when the low-power mode is selected.

According to another aspect of the invention, the method further comprises storing user setting information on the selection of the low-power mode; wherein the intercepting of power supplying comprises determining whether the low-power mode is selected based on the stored user setting information when the computer system is booted.

According to another aspect of the invention, the method further comprises displaying a selection status of the low-power mode.

According to another aspect of the invention, the intercepting of the supply of power comprises determining whether the low-power mode is selected based on a press of the at least one button.

According to another aspect of the invention, the method further comprises backing up data stored in the at least one memory unit before the supply of power to the at least one memory unit is intercepted.

According to another aspect of the invention, the method further comprises intercepting the supply of power from the power supply to at least one termination unit that corresponds to the at least one memory unit.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
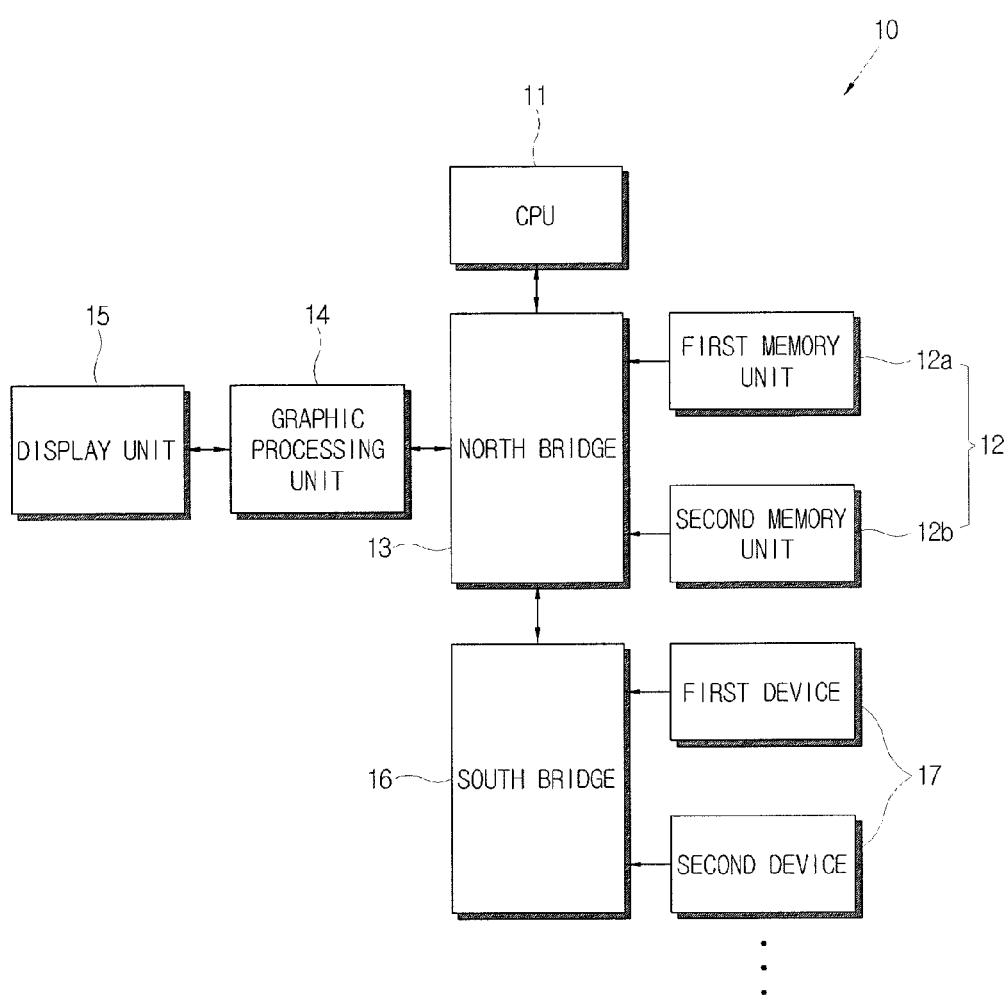
FIG. 1 is a block diagram of a conventional computer system.
Figure 2:
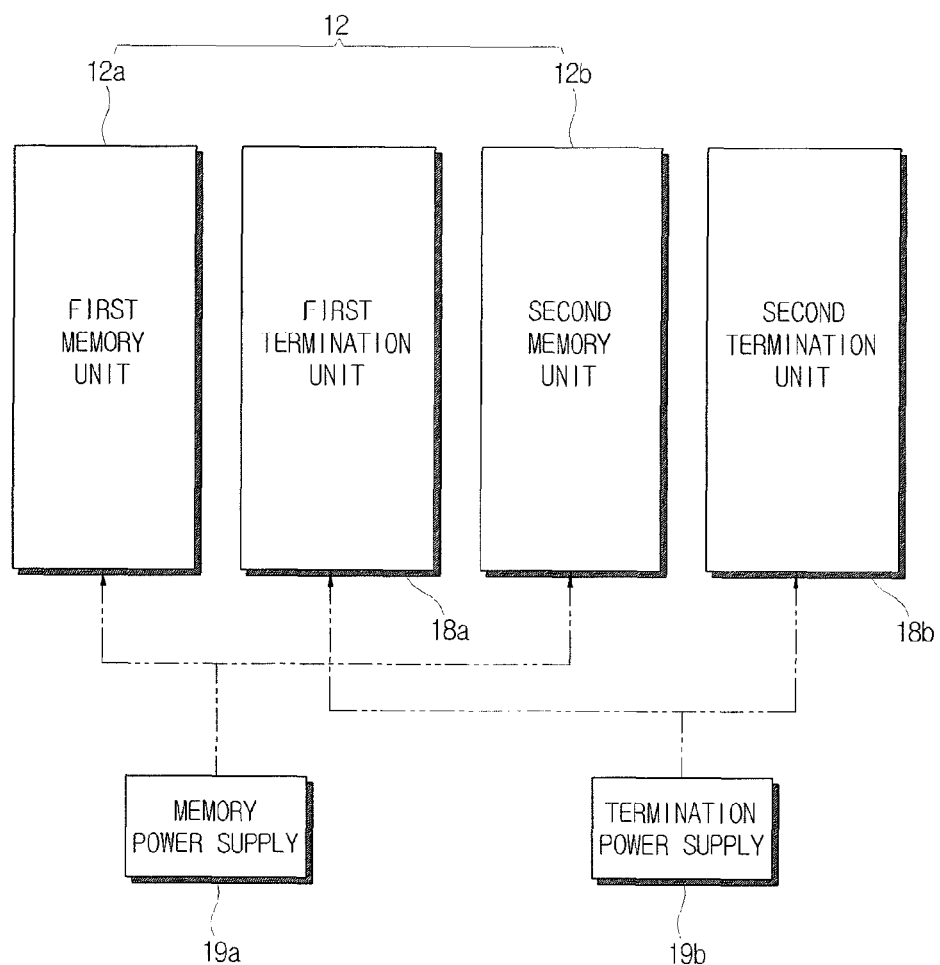
FIG. 2 is a block diagram of a power supplying configuration for a conventional dual-channel structure.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 3:
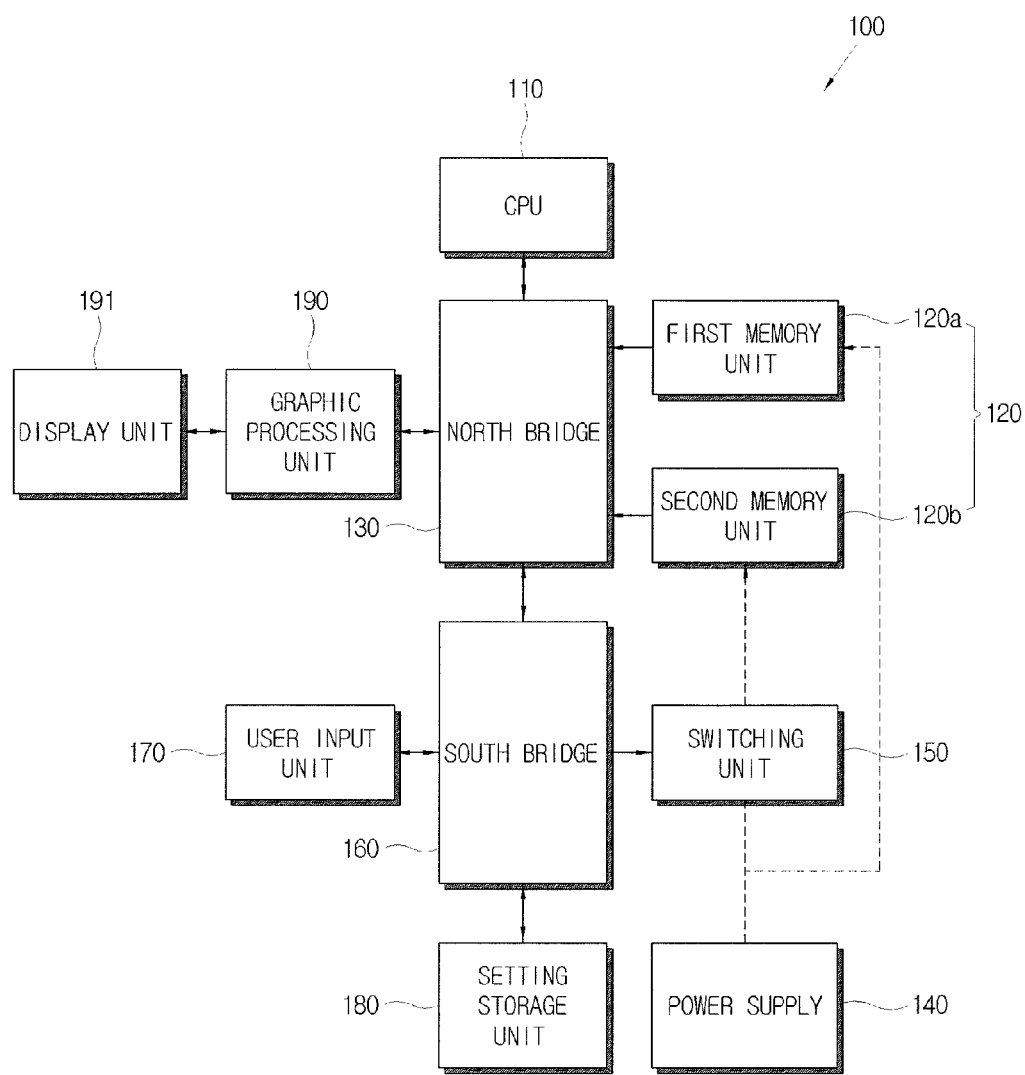
FIG. 3 is a block diagram of a computer system according to an embodiment of the present invention.

FIG. 3 is a block diagram of a computer system 100 according to an embodiment of the present invention. The computer system 100 may be a desktop computer, portable computer, notebook computer, personal digital assistant, personal entertainment device, mobile phone, or the like. The computer system 100 includes a central processing unit (CPU) 110, a memory unit 120, and a North bridge 130. The CPU 110 executes programs and performs various operations. The memory unit 120 stores control programs executed by the CPU 110 and data processed by the CPU 110. The North bridge 130 reads/writes data from/to the memory unit 12 as a memory controller. The memory unit 120 can be provided as a random access memory (RAM). The CPU executing the control program is an example of a controller. The control program can be a basic input/output system (BIOS), an operating system (OS) such as Microsoft Windows, an application program, or a combination. Other aspects of the invention may include additional components. Similarly, other aspects of the invention may incorporate two or more of the components shown in FIG. 3 into a single component. For example, the North bridge 130 may be incorporated into the CPU 110.

The memory unit 120 is provided as a dual-channel memory bus and includes a first memory unit 120a and a second memory unit 120b. The North bridge 130 can individually or collectively read/write data for the first memory unit 120a and the second memory unit 120b. The North bridge 130 may individually read/write data corresponding to a single channel and may collectively read/write data corresponding to a dual-channel. The memory unit 120 may be a volatile memory unit such as random access memory (RAM).

The computer system 100 is operated in a plurality of power modes, including a normal mode and a low-power mode. In the normal mode, power is supplied to both the first memory unit 120a and the second memory unit 120b, and the computer system 100 operates in a dual-channel mode. In the low-power mode, the power supplied to the second memory unit 120b is intercepted, and the computer system 100 operates in a single channel memory structure (referred to as a "single channel mode"). The dual-channel mode is a dual-channel memory structure corresponding to the single channel memory structure. The computer system 100 may operate in additional modes, such as a high-power mode to increase computing capacity at a greater expenditure of power.

The computer system 100 further includes a power supply 140 to supply power to the first memory unit 120a and the second memory unit 120b and a switching unit 150 to perform a switching operation so as to selectively supply power to the second memory unit 120b from the power supply 140. In FIG. 3, a dashed line denotes power flow; other power supply configurations may be used but are omitted for convenience of description.

The CPU 110 intercepts power supplied to the second memory unit 120b from the power supply 140 by controlling the switching unit 150 when the low-power mode is selected. The computer system 100 further includes a South bridge 160 to control input/output of a peripheral device. The CPU 110 may control the switching unit 150 by setting a status of a GPO port (not shown) provided in the South bridge 160 to a predetermined status. The South bridge 160 outputs a control signal to the switching unit 150 according to the status of the GPO port as set by the CPU 110. The switching unit 150 performs a switching operation according to the control signal output from the South bridge 160.

Figure 4:
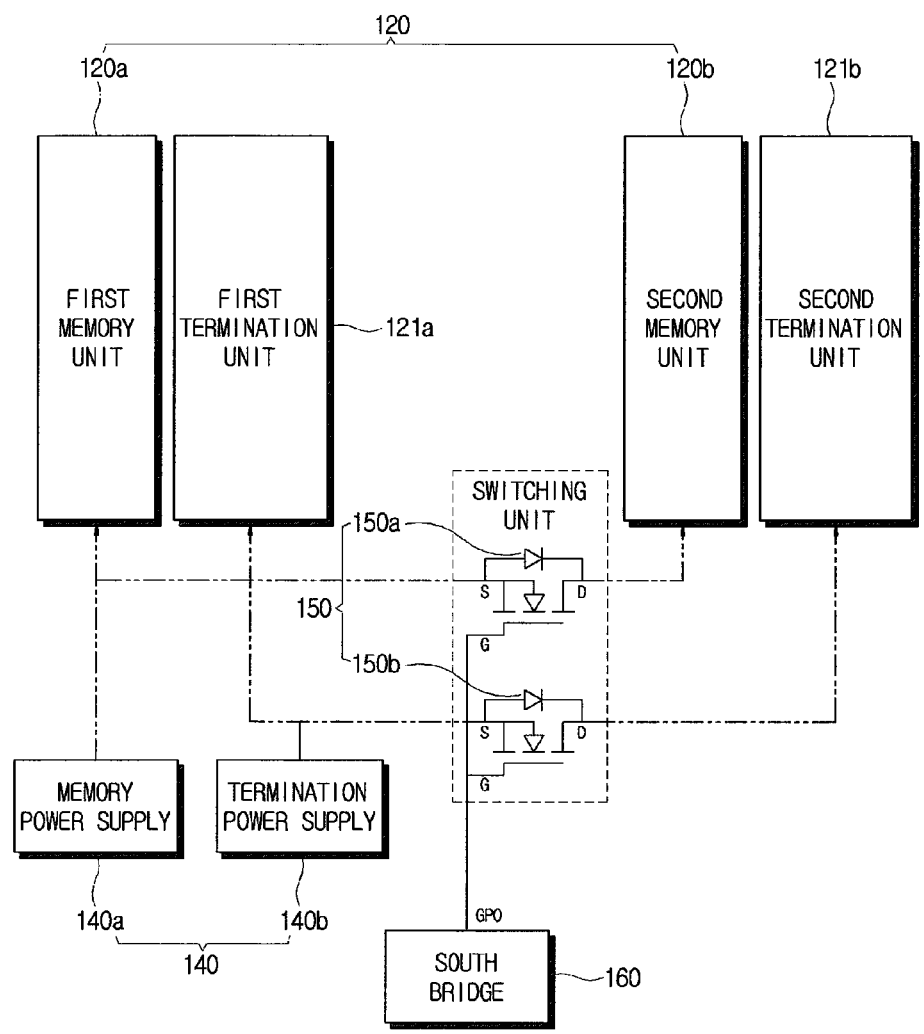
FIG. 4 is a block diagram of a power supply configuration of a memory unit according to an embodiment of the present invention.

FIG. 4 is a block diagram showing power supply to the memory unit 120 according to an embodiment of the present invention. The power supply 140 includes a memory power supply 140a that generates power for the first and second memory units 120a and 120b. The switching unit 150 includes a first metal oxide semiconductor field effect transistor (MOSFET) 150a provided in a power supply line (indicated by the dashed line of FIG. 4) connected to the memory power supply 140a and the second memory unit 120b so as to switch the supply of power. The control signal output from the South bridge 160 is input to a gate G of the first MOSFET 150a. The first MOSFET 150a is turned on/off according to the control signal from the South bridge 160 such that the power supply to the second memory unit 120b is switched.

The computer system 100 may further include a first termination unit 121a and a second termination unit 121b for impedance matching in data transmission so as to improve the signal quality of the memory unit 120, according to an embodiment of the present invention. In addition, the power supply 140 may further include a termination power supply 140b to supply power to the first termination unit 121a and the second termination unit 121b. According to other embodiments of the invention, the switching unit 150 may further include a second MOSFET 150b provided in the power supply line (indicated by the dashed line of FIG. 4) connected between the termination power supply 140b and the second termination unit 121b to switch the supply of power. Operation of the second MOSFET 150b is the same as that of the first MOSFET 150a, and therefore further description of the second MOSFET 150b will be omitted. Other aspects of the present invention may employ different ways to control the power supply, such as a different type of transistor.

Returning to FIG. 3, the computer system 100 includes a user input unit 170 to receive a user's selection of a power mode. The user input unit 170 may be a keyboard, a mouse, a touchpad, a microphone, or other input device capable of receiving user input. The CPU 110 may determine whether the low-power mode is selected by a user through the user input unit 170. Other aspects of the invention may employ other ways to determine when to switch to the low-power mode, such as after a predetermined idle time of the computer system 100, and/or may omit the user input unit 170.

The low-power mode can be pre-selected. In this case, the computer system 100 further includes a setting storage unit 180 to store information on a power mode selected by the user. The setting storage unit 180 may be provided as a hard disk drive (HDD) or an EEPROM. The CPU 110 stores information on a power mode selected by the user through the user input unit 170 in advance. The CPU 110 refers to the power mode information stored in the setting storage unit 180 when the computer system 100 is booted to determine whether the power mode is set to the low-power mode. If the power mode is set to the low-power mode, the CPU 110 controls the switching unit 150 to intercept the power supply to the second memory unit 120b.

Figure 5A:
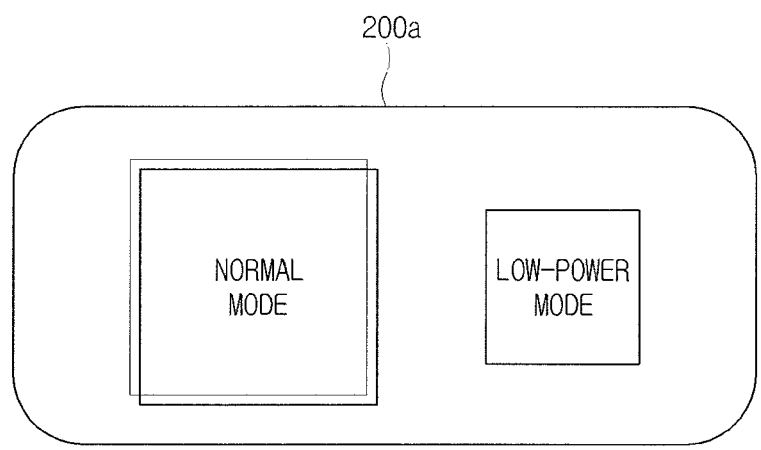
FIGS. 5A and 5B show a user interface (UI) according to an embodiment of the present invention.
Figure 5B:
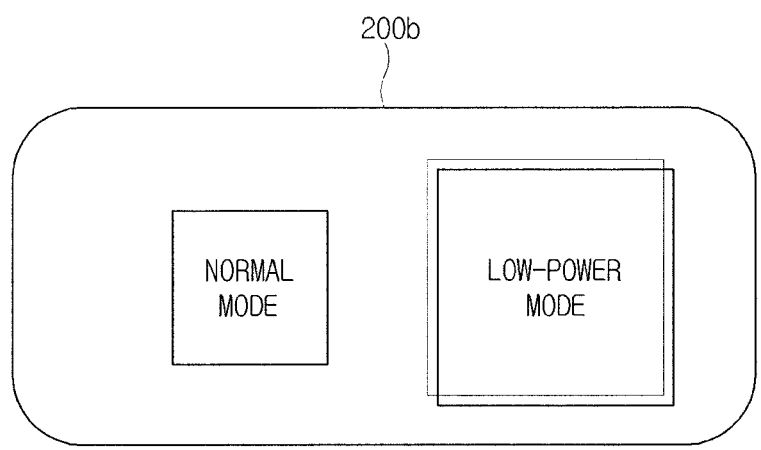

According to another embodiment of the present invention, the computer system 100 may further include a graphic processing unit 190 to generate user interfaces (UIs) 200a and 200b (shown in FIG. 5A and FIG. 5B) relating to a power mode under support of the operating system (OS), and a display unit 191 to display the UIs 200a and 200b generated by the graphic processing unit 190. The graphic processing unit 190 is an example of a UI generator in the present invention. As shown in FIGS. 5A and 5B, the UIs 200a and 200b display a current power mode selection.

Selection of the low-power mode can be performed in real-time according to another embodiment of the present invention. The user input unit 170 may include at least one button (not shown) for a power mode. The button can be provided as a key or a combination of a plurality of keys provided on a keyboard. The power mode may be toggled to the normal mode or the low-power mode when the button is pressed. The CPU 110 periodically monitors whether the button of the user input unit 170 is pressed so as to determine whether the low-power mode is selected.

According to another embodiment of the present invention, the CPU 110 moves data stored in the second memory unit 120b to the first memory unit 120a before the power supplied to the second memory unit 120b is intercepted. When the low-power mode is selected, system operation is temporarily stopped by an interrupt operation so that necessary data stored in the second memory unit 120b can be moved to the first memory unit 120a. Accordingly, a loss of data stored in the second memory unit 120 can be prevented when the power mode changes from the dual-channel mode to the single channel mode.

Figure 6:
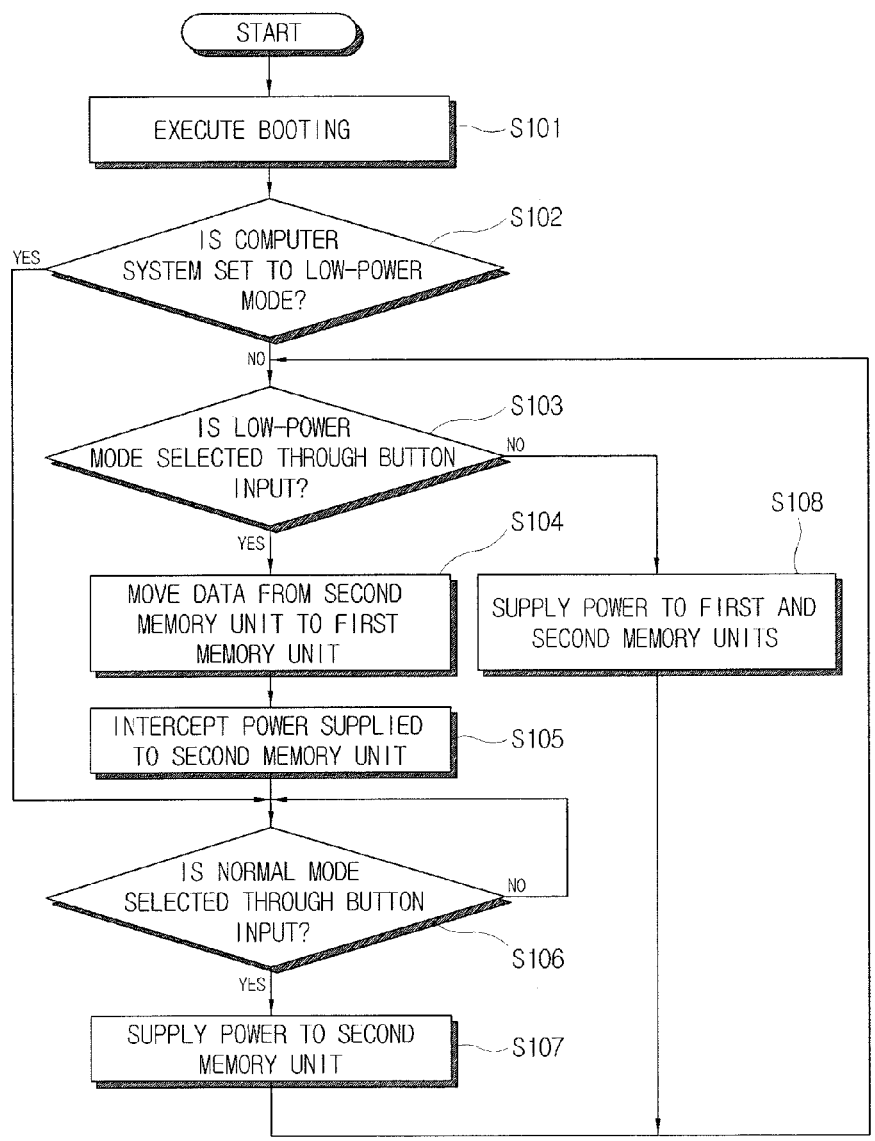
FIG. 6 is a flowchart of an operation of the computer system according to an embodiment of the present invention.

FIG. 6 is an operational flowchart of the computer system 100 according to an embodiment of the present invention. When power is turned on, a booting operation is performed at operation S101. When the computer system 100 is booted, it is determined whether the power mode is preset to a low-power mode at operation S102. When the power mode is not preset to the low-power mode in operation S102, the computer system 100 operates in a normal mode. At operation S103, the selection of the low-power mode through the user input unit 170 can be determined during the normal operation. If the low-power mode is not selected at operation S103, then at operation S108 power is supplied to both the first memory unit 120a and the second memory unit 120b and the computer system 100 operates in the dual-channel mode. The operation process of the computer system 100 then returns to operation S103.

If the low-power mode is selected at operation S103, then at operation S104 operation of the system is temporarily stopped and at least some of the data stored in the second memory unit 120b is moved to the first memory unit 120a. When the migration of the data from the second memory unit 120b to the first memory unit 120a is completed or when the low-power mode is selected, then at operation S105 power supplied to the second memory unit 120b is intercepted and the system operates in the single channel mode.

Subsequently, it is determined whether a normal mode is selected by the user while the computer system 100 is operating in the single channel mode at operation S106. If the normal mode is not selected, the process returns to operation S105. If the normal mode is selected at the operation of S106, then at operation S107 power is supplied to the second memory unit 120b and the process returns to operation S103.

As described above, a computer system employing the dual-channel memory structure that can minimize power consumption and a control method thereof are provided according to aspects of the present invention. Particularly, a portable computer system employing the dual-channel memory structure controls memory performance when a user executes an application that is not affected by the memory performance, thereby maximizing battery life.

Power control techniques according to aspects of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CDs and DVDs; magneto-optical media such as optical disks; and hardware devices that are specially configured to store and perform program instructions, such as read-only memory (ROM), random access memory (RAM), flash memory, and the like; and a computer data signal embodied in a carrier wave comprising a compression source code segment and an encryption source code segment (such as data transmission through the Internet). Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

Although a few embodiments of the present invention have been shown and described, it will be appreciated by those skilled in the art that changes may be made in this embodiment without departing from the principles and spirit of the invention, the scope of which is defined in the claims and their equivalents.

What is claimed is:

1. A computer system comprising:
    a main memory comprising a plurality of memory units which are arranged in a dual channel architecture;
    a power supply to supply power to the plurality of memory units;
    a controller to control the supply of power to the plurality of memory units so as to intercept power supplied from the power supply to at least one, but not all, of the plurality of memory units, according to a user selection input setting a low-power mode, wherein the controller comprises a Central Processing Unit (CPU) to execute control programs and perform operations, and the plurality of memory units loads the control programs comprising a basic input/output system (BIOS) and an operating system (OS) executed by the CPU; and
    a user input unit to select the low-power mode;
    wherein the controller determines whether the low-power mode is selected by the user input unit, and intercepts power supplied to at least one memory unit of the plurality of memory units that corresponds to the low-power mode when the user selects the low-power mode, and
    wherein a power mode comprising a normal mode and the low-power mode is toggled to the normal mode or the low-power mode when a button included in the user input is pressed, and the CPU monitors whether the button of the user input unit is pressed so as to determine whether the low-power mode is selected.

2. The computer system of claim 1, wherein the plurality of memory units comprises a first memory unit and a second memory unit.

3. The computer system of claim 1, further comprising:
    a user interface (UI) generator to generate a UI; and
    a display unit that displays the UI generated by the UI generator,
    wherein the controller controls the UI generator to display a selection status of the low-power mode on the display unit.

4. The computer system of claim 1, wherein the controller backs up data stored in the at least one memory unit before intercepting the supply of power to the memory unit.

5. The computer system of claim 1, wherein the computer system is a mobile computer system.

6. The computer system of claim 1, further comprising a setting storage unit to store user setting information on the selection of the low-power mode by the user selection input, wherein the controller determines whether the low-power mode is selected in accordance with the setting information stored in the setting storage unit when the computer system is booted.

7. The computer system of claim 6, wherein the setting information comprises setting values of the BIOS and the OS.

8. The computer system of claim 1, further comprising a plurality of termination units corresponding to the plurality of memory units to receive power from the power supply and to perform impedance matching during data transmission,
    wherein the controller intercepts power supplied from the power supply to at least one termination unit corresponding to the at least one memory unit.

9. The computer system of claim 1, further comprising a switching unit to intercept the supply of power to the at least one memory unit based on the control of the controller,
    wherein the controller controls the switching unit by setting a status of a GPO port provided in a south bridge to a predetermined status corresponding to the low-power mode, and the switching unit performs a switching operation to intercept the supply of power to the at least one memory unit according to the control signal output from the south bridge.

10. The computer system of claim 9, wherein the switching unit is arranged between the plurality of memory units and a south bridge of the computer system.

11. A method of controlling a computer system having a Central Processing Unit (CPU) to execute control programs and perform operations, a plurality of memory units of a main memory to load the control programs comprising a Basis Input/Output System (BIOS) and an Operating System (OS) executed by the CPU and a power supply to supply power to the plurality of memory units, the method comprising:
    receiving a user selection input setting a low-power mode relating to the plurality of memory units which are arranged in a dual-channel architecture;
    intercepting a supply of power to at least one, but not all, of the plurality of memory units from the power supply according to the user selection input,
    wherein the receiving of the user selection input comprises determining whether the low-power mode is selected by a user input unit,
    wherein the intercepting of the supply of power comprises intercepting power supplied to at least one memory unit of the plurality of memory units that corresponds to the low-power mode when the low-power mode is selected, and
    wherein a power mode comprising a normal mode and the low-power mode is toggled to the normal mode or the low-power mode when a button included in the user input is pressed, and the CPU monitors whether the button of the user input unit is pressed so as to determine whether the low-power mode is selected.

12. The method of claim 11, wherein the plurality of memory units comprises a first memory unit and a second memory unit.

13. The method of claim 11, further comprising displaying a selection status of the low-power mode.

14. The method of claim 11, further comprising backing up data stored in the at least one memory unit before the supply of power to the at least one memory unit is intercepted.

15. The method of claim 11, further comprising:
    storing user setting information on the selection of the low-power mode;

wherein the intercepting of power supplying comprises determining, when the computer system is booted, whether the low-power mode is selected based on the stored user setting.

16. The method of claim 15, wherein the setting information comprises setting values of the BIOS and the OS.

17. The method of claim 11, further comprising:
intercepting the supply of power supplied from the power supply to at least one termination unit that corresponds to the at least one memory unit; and
performing impedance matching during data transmission.

18. The method of claim 11, wherein a power mode comprising a normal mode and the low-power mode is toggled to the normal mode or the low-power mode when the user input unit is manipulated, and the controller monitors whether the user input unit is manipulated so as to determine whether the low-power mode is selected.

19. A computer system comprising:
a main memory comprising a plurality of memory units arranged in a dual-channel architecture;
a power supply to supply power to the plurality of memory units;
a controller to control the power supply to intercept the supply of power to at least one, but not all, of the plurality of memory units based on a user selection input setting a low-power mode; and to perform impedance matching during data transmission, wherein the controller comprises a Central Processing Unit (CPU) to execute control programs and perform operations, and the plurality of memory units loads the control programs comprising a basic input/output system (BIOS) and an operating system (OS) executed by the CPU; and
a user input unit to select the low-power mode,
wherein the controller determines whether the low-power mode is selected by the user input unit, and intercepts power supplied to at least one memory unit of the plurality of memory units that corresponds to the low-power mode when the user selects the low-power mode, and
wherein a power mode comprising a normal mode and the low-power mode is toggled to the normal mode or the low-power mode when a button included in the user input is pressed, and the CPU monitors whether the button of the user input unit is pressed so as to determine whether the low-power mode is selected.

20. The computer system of claim 19, further comprising a setting storage unit to store user setting information on the selection of the low-power mode by the user selection input,
wherein the controller determines whether the low-power mode is selected in accordance with the setting information stored in the setting storage unit when the computer system is booted.

21. The computer system of claim 20, wherein the setting information comprises setting values of the BIOS and the OS.

22. The computer system of claim 19, further comprising a plurality of termination units corresponding to the plurality of memory units to receive power from the power supply and to perform impedance matching during data transmission,
wherein the controller intercepts power supplied from the power supply to at least one termination unit corresponding to the at least one memory unit.

23. The computer system of claim 19, further comprising a switching unit to intercept the supply of power to the at least one memory unit based on the control of the controller,
wherein the controller controls the switching unit by setting a status of a GPO port provided in a south bridge to a predetermined status corresponding to the low-power mode, and the switching unit performs a switching operation to intercept the supply of power to the at least one memory unit according to the control signal output from the south bridge.

* * * * *